7 Sheets--Sheet 2.

J. A. LAWSON.
Hot-Air Furnaces.

No. 158,954.   Patented Jan. 19, 1875.

WITNESSES:
Jas. E. Hitchinson
John R. Young

INVENTOR.
James A. Lawson, by
Prindle and Dean, his Attys

J. A. LAWSON.
Hot-Air Furnaces.

No. 158,954.

7 Sheets--Sheet 4.

Patented Jan. 19, 1875.

WITNESSES
Jas. E. Hutchinson
John R. Young

INVENTOR
James A. Lawson, by
Prindle and Deane, his Att'ys

J. A. LAWSON.
Hot-Air Furnaces.
No. 158,954.
7 Sheets--Sheet 5.
Patented Jan. 19, 1875.
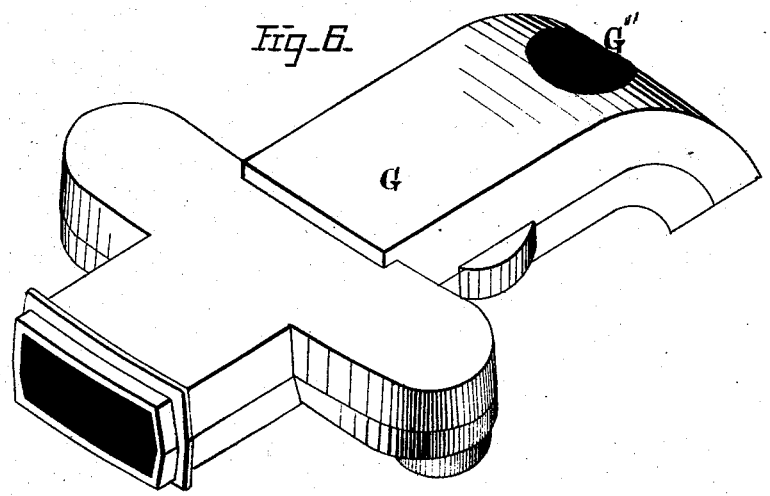
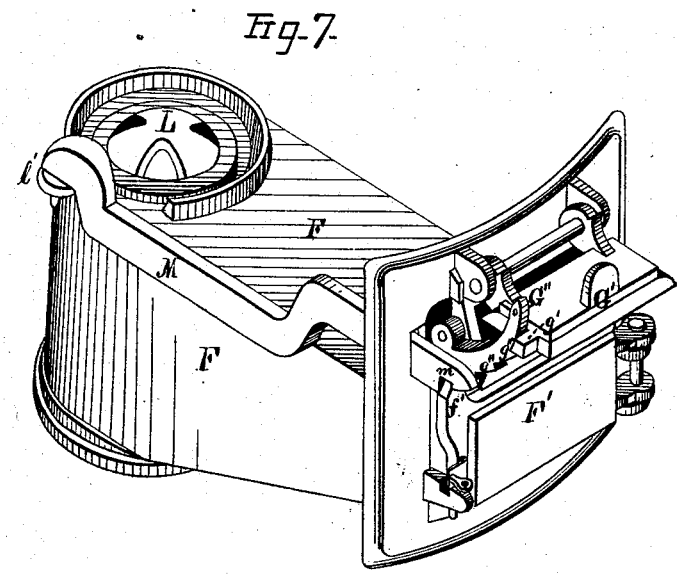

7 Sheets--Sheet 6.

J. A. LAWSON.
Hot-Air Furnaces.

No. 158,954.

Patented Jan. 19, 1875.

J. A. LAWSON.
Hot-Air Furnaces.

No. 158,954.

7 Sheets--Sheet 7.

Patented Jan. 19, 1875.

WITNESSES:
Jas. E. Hutchinson
John R. Young

INVENTOR.
James A. Lawson, by
Prindle and Deane, his Att'ys

UNITED STATES PATENT OFFICE.

JAMES A. LAWSON, OF TROY, NEW YORK.

IMPROVEMENT IN HOT-AIR FURNACES.

Specification forming part of Letters Patent No. 158,954, dated January 19, 1875; application filed April 4, 1874.

*To all whom it may concern:*

Be it known that I, JAMES A. LAWSON, of Troy, in the county of Rensselaer and in the State of New York, have invented certain new and useful Improvements in Heating-Furnaces; and do hereby declare that the following is a full, clear, and exact description thereof, reference being had to the accompanying drawings, making a part of this specification, in which—

Figure 1:
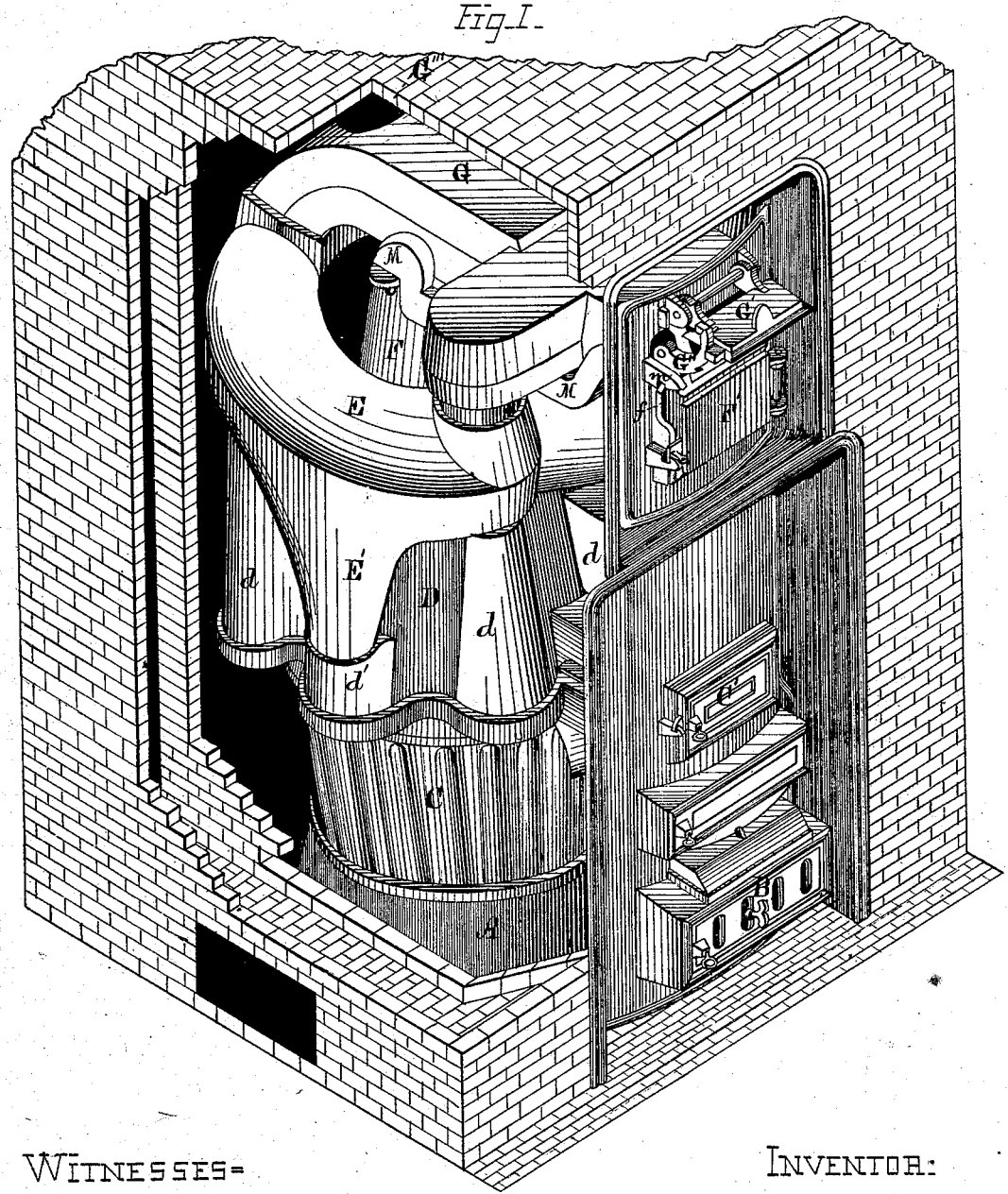
Figure 2:
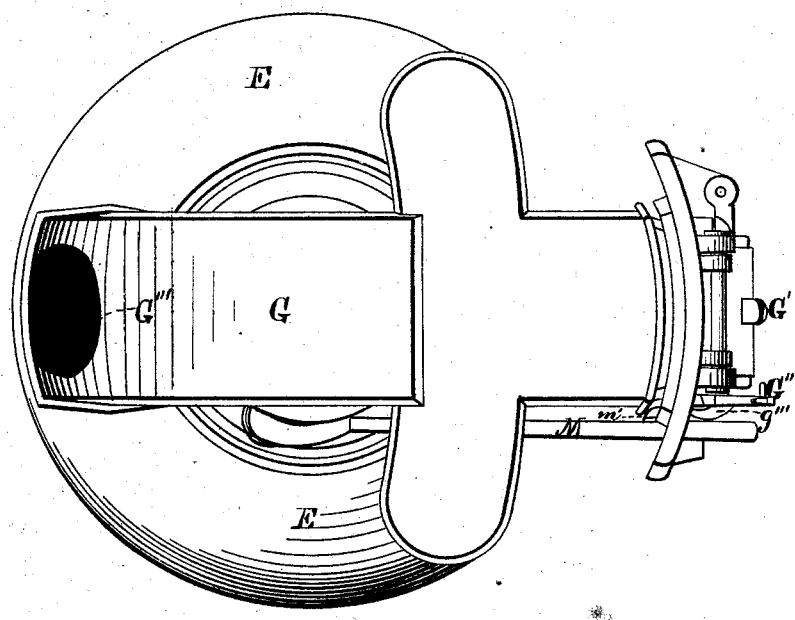
Figure 3:
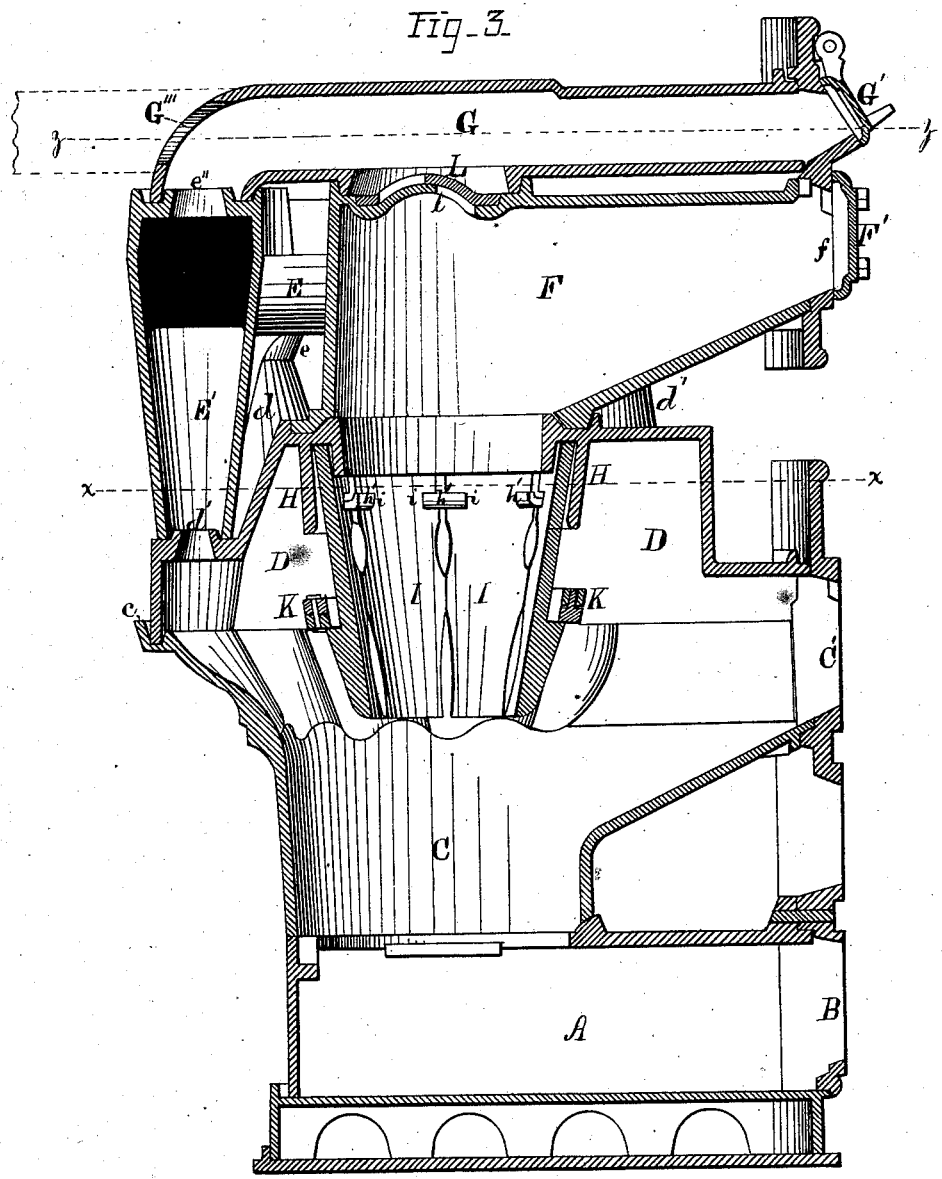
Figure 4:
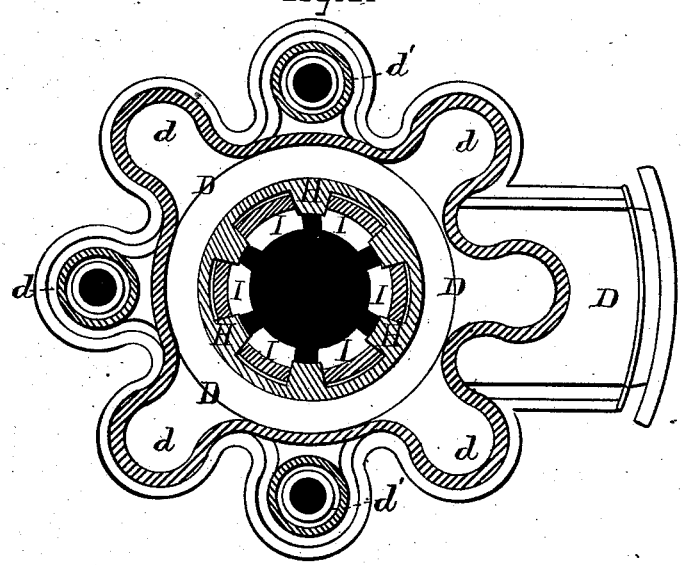
Figure 5:
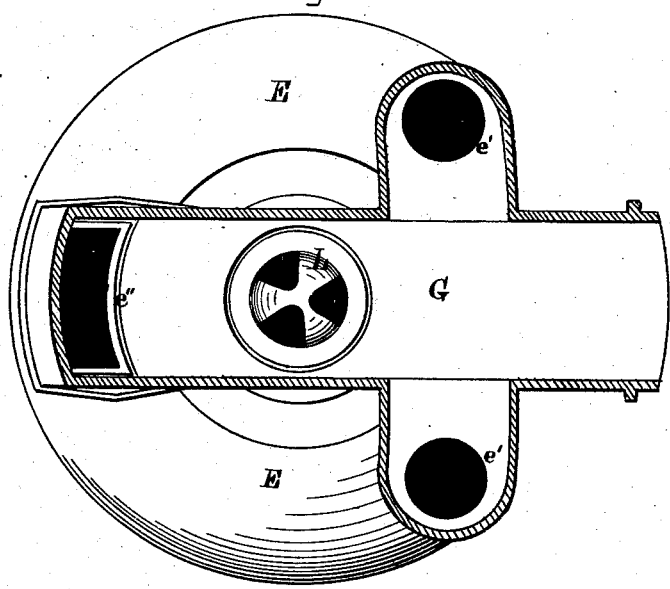
Figure 8:
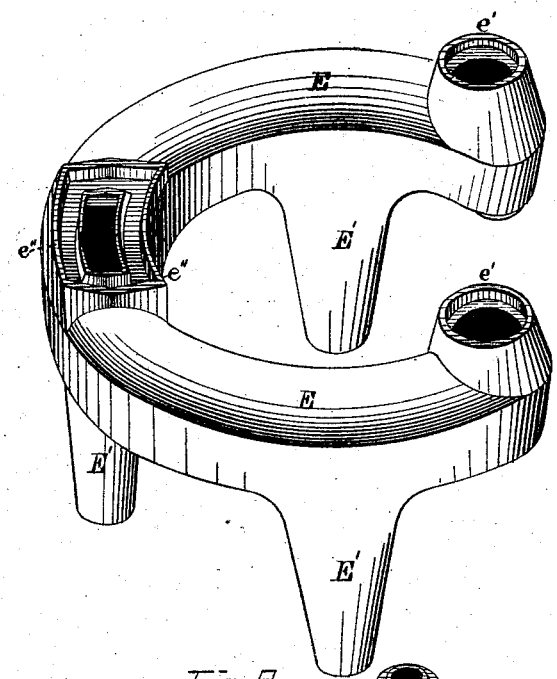
Figure 9:
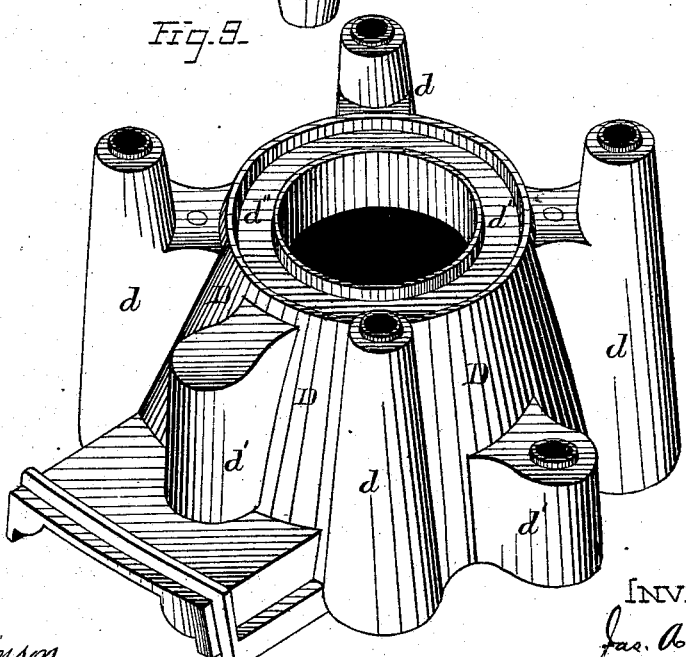
Figure 10:
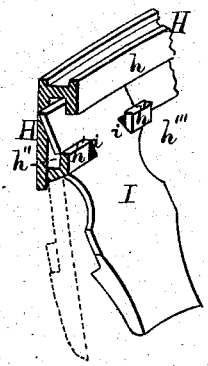
Figure 11:
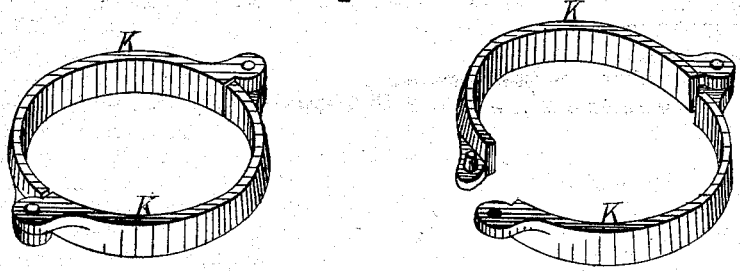

Figure 1 is a perspective view of my improved furnace as arranged for use, a portion of the brick casing being removed. Fig. 2 is a plan view of the upper side of the same. Fig. 3 is a vertical central section upon a line extending from front to rear. Figs. 4 and 5 are horizontal sections upon lines $x\ x$ and $z\ z$, respectively, of Fig. 3. Fig. 6 is a perspective view of the upper side of the cross-pipe. Fig. 7 is a like view of the coal-supply chamber. Figs. 8 and 9 are perspective views, respectively, of the dome-ring and dome. Fig. 10 is a like view of a section of the lower end of the magazine, the full lines showing the position of one of the staves while being inserted, while the dotted lines show the position of said part when in place, and Fig. 11 is a perspective view of the jointed ring for inclosing the lower ends of the staves.

Letters of like name and kind refer to like parts in each of the figures.

My invention is an improvement upon a furnace which is capable of use either as a surface or a base burner; and it consists, principally, in the peculiar construction of the dome and its combination with the contiguous portions of the furnace, substantially as and for the purpose hereinafter specified. It consists, further, in the construction of the dome-ring and its combination with the dome, substantially as and for the purpose hereinafter shown. It consists, further, in the relative arrangement of the discharge-openings of the dome-ring, substantially as and for the purpose hereinafter set forth. It consists, further, in the construction of the cross-pipe and its combination with the dome-ring, substantially as and for the purpose hereinafter shown and described. It consists, further, in the means employed for securing in an elevated position the check-draft door, substantially as and for the purpose hereinafter set forth. It consists, further, in combining the check-draft door with the feed-door and gas-damper, so as to cause the opening of the latter to cause said check-draft door to close, substantially as and for the purpose hereinafter shown and described. It consists, further, in a magazine having its lower portion formed of staves or vertical sections which are constructed separately, and at their upper ends are connected to or with a suitable supporting-ring, so as to be capable of insertion in or removal from position through the lower feed-door, substantially as and for the purpose hereinafter specified. It consists, further, in the construction and combination of the staves forming the lower portion of the magazine, and their supporting-ring, substantially as and for the purpose hereinafter shown. It consists, finally, in the means employed for confining in horizontal position the lower portions of the magazine-staves, substantially as and for the purpose hereinafter set forth.

In the annexed drawings, A represents the ash-pit of a heater, provided at its front side with a suitable door, B, and surmounted by a fire-pot, C, all of usual construction. From the inner end of the throat C' of the fire-pot C the upper grooved edge of the latter is formed upon a series of reverse curves, as shown, and within said groove $c$ is contained the correspondingly-shaped lower edge of a casting, D, which forms a cover for said throat C' and a dome for said fire-pot. At each outward swell or curve of the lower edge of the dome D is formed a pipe, $d$, which, at its lower end and inner side, communicates with the interior of said dome, and, extending vertically upward, is provided at its upper end with a discharge-opening. Four of the pipes $d$ and $d$ extend upward above the top of the dome D. One pipe, over the throat C', is shortened and inclosed at its upper end, while the remaining intermediate pipes $d'$ and $d'$ extend but slightly above the upper line of said throat. Resting upon the upper ends of the pipes $d$ and $d$ is a horseshoe-shaped ring, E, which is made hollow, and is provided upon its lower side with suitable thimbles $e$ and $e$, which surround and project downward from openings in said ring, and fit into corresponding seats that are formed within the upper ends of said pipes. Between the pipes $d$ and $d$ the ring E is extended downward, as seen in Figs. 1 and 8, so as to form hollow legs E' and E' that are open at their lower ends and fit over the openings of the short pipes $d'$ and $d'$, such arrangement affording direct communication between the lower portion of the combustion-chamber and said ring, while, by means of the long pipes $d$ and $d$ and their connections, equal communication is furnished between the upper portion of said chamber and said ring.

The upper side of the dome D is open, as seen in Fig. 9, and is provided with an annular seat or groove, $d''$, within which is fitted a corresponding bearing that is formed upon the lower open side of a coal-chute, F, which latter part is extended forward, as shown in Fig. 3, and at its open end or mouth $f$ is provided with a door, F', fuel for the furnace being supplied through said mouth. At the forward portion or ends and upper side of the ring E, and at its rear upper side, are provided openings $e'$ and $e''$ respectively, which are surrounded by suitable seats, and are inclosed by means of a cross-pipe, G, which rests upon said ring, and has thimbled openings that coincide with and fit over those in said pipe E. The front open end of the pipe G is inclosed by means of a hinged door, G', while at or near its rear end is placed the usual exit-flue through which the heated escaping products of combustion pass to the chimney, said exit-flue being thus situated directly above or in rear of the rear opening $e''$, through which said gases pass from the ring E to said cross-pipe G.

In order that the heated gases may pass into the ring E with equal volume from the front and rear sides of the combustion-chamber, the rear opening $e''$ is made smaller than the other openings, so as to compel the largest proportion of said gases to pass to the front in order to find an outlet.

The furnace thus constructed is intended for use as a surface-burner, (in which event the upper feed-door is not needed;) but when desired for use as a base-burner, may be easily and quickly changed, as follows: A ring, H, corresponding in interior dimensions to the diameter of the opening in the top of the dome D, is provided within its inner face with two angular flanges, $h$ and $h'$, which form an annular groove, $h''$, that has a shape as shown in Fig. 10. The lower flange, $h'$, is cut away at regular intervals, so as to form a series of notches, $h'''$, that have vertical sides, and are preferably somewhat wider than the remaining portions of said flange. Within each notch $h'''$ is placed one end of a stave, I, which stave, being wider than the space, is provided with notches $i$ and $i$ within its edges, to permit of its insertion within the groove $h''$; is formed upon a horizontal line which corresponds to the curve of the ring H, and, in connection with other similar staves, forms a barrel-inclosure which constitutes the lower end of a magazine. The thickness of the upper end of each stave corresponds to the space between the vertical portion of the upper flange, $h$, and the inner face of the ring H, and, substantially filling the same, prevents the lower portions of said stave from passing outward beyond a vertical line, while its vertical position is insured by the shoulders formed by the upper sides of the notches $i$ and $i$, which shoulders are contained within the groove $h''$, and rest upon the lower flange, $h'$.

To place a stave in position, its upper end is inserted within the groove $h''$, and moved upward until the notches $i$ and $i$ coincide with the sections of the lower flange, $h'$, after which the lower end of the stave is moved outward to its place.

In order that an undue strain may not be thrown upon either of the staves, they are inclosed near their lower ends by means of a ring, K, which rests upon a horizontal shoulder, $i'$, that is formed upon the outer face of each stave. For convenience of insertion, the ring K is made in two sections, which are pivoted together at one point of division, and their opposite ends are either connected by means of a dowel-pin, that is attached to one part and engages with a corresponding opening formed in the opposite part, as shown in Fig. 11, or by a bolt passed through coinciding openings in said ends.

The furnace is now a base-burner, and has a magazine, which, as shown in Fig. 3, extends from the upper feed-door downward to the fire-pot, and furnishes sufficient space for coal without interfering in any material degree with the functions or capacity of other parts of the furnace.

In order that the ignition and explosion of gas within the magazine may be prevented whenever the feed-door is opened, a connection is made between the upper portion F of the magazine and the cross-pipe G, and within the opening $l$ thus formed is placed a horizontally-moving damper, L, which may be rotated upon its axis, so as to open or close communication between said parts, as desired.

To an arm, $l'$, that extends laterally outward from one side of the damper L, is pivoted one end of a bar, M, which from thence passes forward through a suitable slot in the frame of the upper feed-door F'.

The forward end and lower side of the bar M is provided with a notch, $m$, which corresponds to and embraces the upper end of an arm, $f'$, that projects upward from the outer upper corner of the door F', so that when the latter is opened said bar will be moved longitudinally outward until said arm passes laterally out of engagement, such motion being sufficient, however, to entirely open the damper L. Upon closing the feed-door, its arm $f'$ will again engage with the damper-bar and return the same to its former position, so as to close the damper. This arrangement of parts prevents the opening of the feed-door without at the same instant and by the same motion causing the damper to be opened, so as to furnish a direct communication between the magazine and exit-flue, and cause the gases contained within the former to escape into the latter. The upper door, G', that incloses the front end of the cross-pipe G is employed for checking the draft of the furnace, by the admission of cold air into said pipe in the usual manner, the quantity of air being regulated by the degree to which said door is opened. Being hinged at its upper edge, the weight of the door G' is sufficient to close it, when opened, while, to maintain the same in an elevated position, a curved ratchet-bar, G'', is pivoted at one end to or upon the door-frame, between the end of said door and the outer end of the bar M, said bar G'' having free motion in a vertical plane. Upon the end of the door G' is provided a lug, $g'$, which engages with the teeth $g''$ of the ratchet-bar G'', said teeth being constructed so as to rake upward and forward. The weight of the ratchet-bar G'' causes it to rest upon the lug $g'$ of the door, so that when the latter is raised one of the teeth of said bar drops instantly into engagement with said lug, and locks said door in position. By raising the outer end of said bar said door is released and falls to place. In order that the check-draft G' may be caused to automatically close, if opened, when the feed door is opened, a lug, $g'''$, is formed upon the outer side and near the lower end of the ratchet-bar G'', and a similar lug, $m'$, upon the inner side of the damper-bar M, slightly in rear of said lug $g'''$ of the ratchet-bar G'', and causes the latter to be thrown forward and upward, so as to release the check-draft door and permit the same to drop to position.

It will be seen that, by my combination of the feed-door, check-draft, and gas-escape damper, no liability exists to an explosion or outward escape of the gas in consequence of negligence or inattention upon the part of the attendant, the necessary operation of said damper and check-draft being independent of such control, and entirely automatic.

Having thus fully set forth the nature and merits of my invention, what I claim as new is—

1. The dome D, provided with the long and short discharge-pipes $d$ and $d'$, respectively, in combination with the ring E, having the hollow legs E' and E', and inlet-openings $e$ and $e$, substantially as and for the purpose specified.

2. The ring E, provided with the hollow legs E' and E', inlet-openings $e$ and $e$, and discharge-openings $e'$, $e'$, and $e''$, in combination with the dome D, having the long and the short discharge-pipes $d$ and $d'$, respectively, substantially as and for the purpose shown.

3. The ring E, provided with the large discharge-openings $e'$ and $e'$ within its forward portion, and the smaller discharge-opening $e''$ within its rear side, in combination with the cross-pipe G, substantially as and for the purpose set forth.

4. In combination with the ring E, provided with the discharge-openings $e'$, $e'$, and $e''$, the cross-pipe G having thimbled inlet-openings which coincide with said discharge-openings, and provided with an exit-flue, G''', substantially as and for the purpose shown and described.

5. In combination with the hinged upward-swinging check-draft door G', provided with the lug $g'$, the ratchet-bar G'' $g''$, pivoted upon the door-frame and engaging with said lug, substantially as and for the purpose shown and described.

6. The combination of the feed-door F', having the locking-arm $f'$, with the check-draft door G', provided with lug $g'$, and with the damper L, having the radial arm $l'$, the bar M, provided with the notch $m$ and lug $m'$, by means of which said door and damper are connected, substantially as and for the purpose specified.

7. In combination with the ring H, provided with the flanges $h$ and $h'$, the annular groove $h''$, and the notches $h'''$, the staves I and I, provided each with the notches $i$ and $i$, substantially as and for the purpose shown.

8. The flanged grooved ring H, $h$, $h'$, $h''$, and $h'''$, constructed as shown, and combined with the staves I, $i$, and $i$, in the manner and for the purpose substantially as set forth.

9. In combination with the staves I $i'$, the sectional hinged or jointed ring K, substantially as and for the purpose shown and described.

In testimony that I claim the foregoing I have hereunto set my hand this 31st day of March, 1874.

J. A. LAWSON.

Witnesses:
GEO. S. PRINDLE,
WILLIAM FITCH.